(No Model.) 5 Sheets—Sheet 1.
W. H. NORTHCUTT.
COMBINATION PAVING BLOCK AND SYSTEM OF PAVING.
No. 584,269. Patented June 8, 1897.
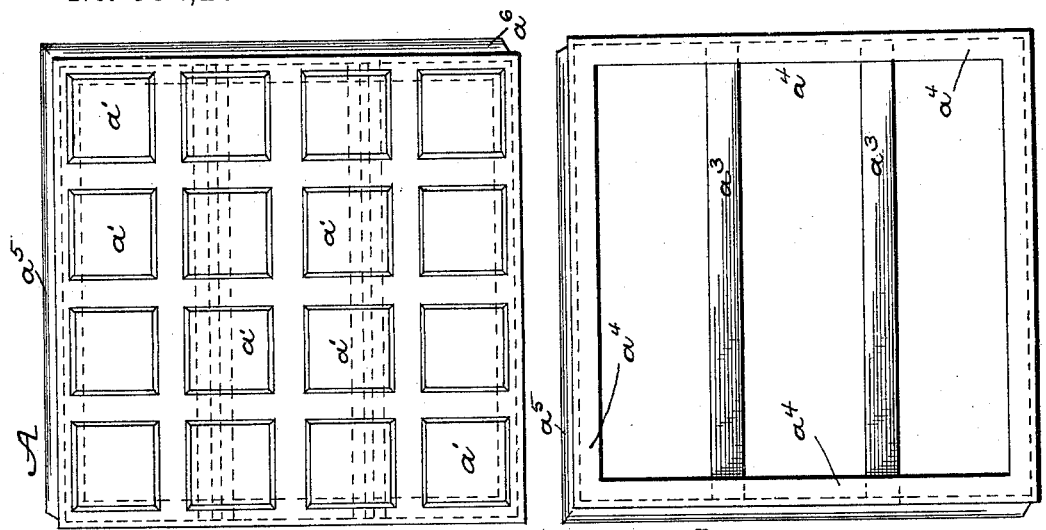
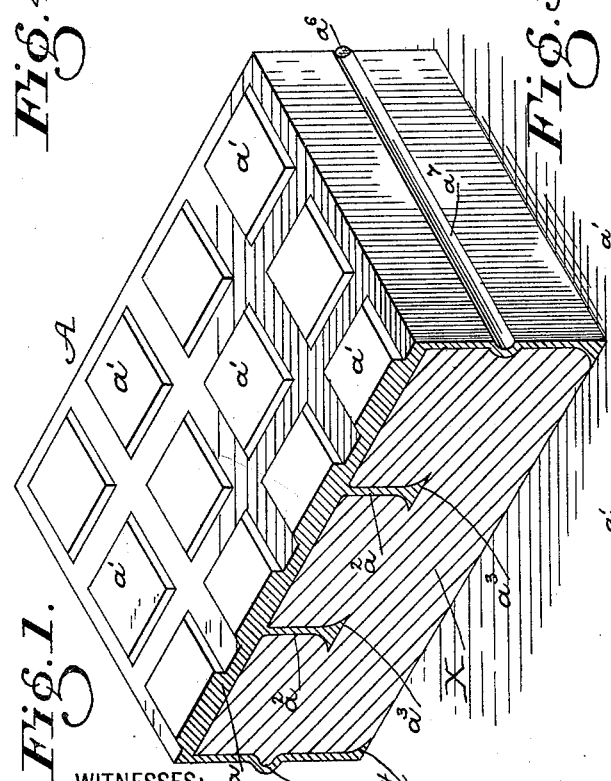
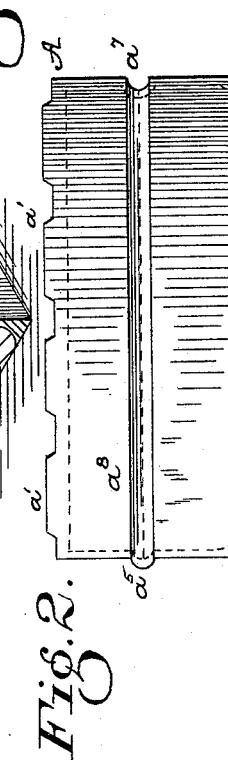
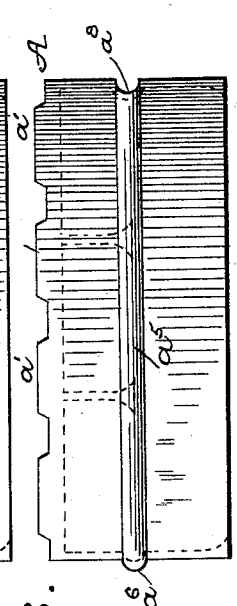
WITNESSES:
Z. Frank Martin
Wm H Gilbert
INVENTOR
Wm H Northcutt,
BY
Frank M Burnham.
his ATTORNEY.

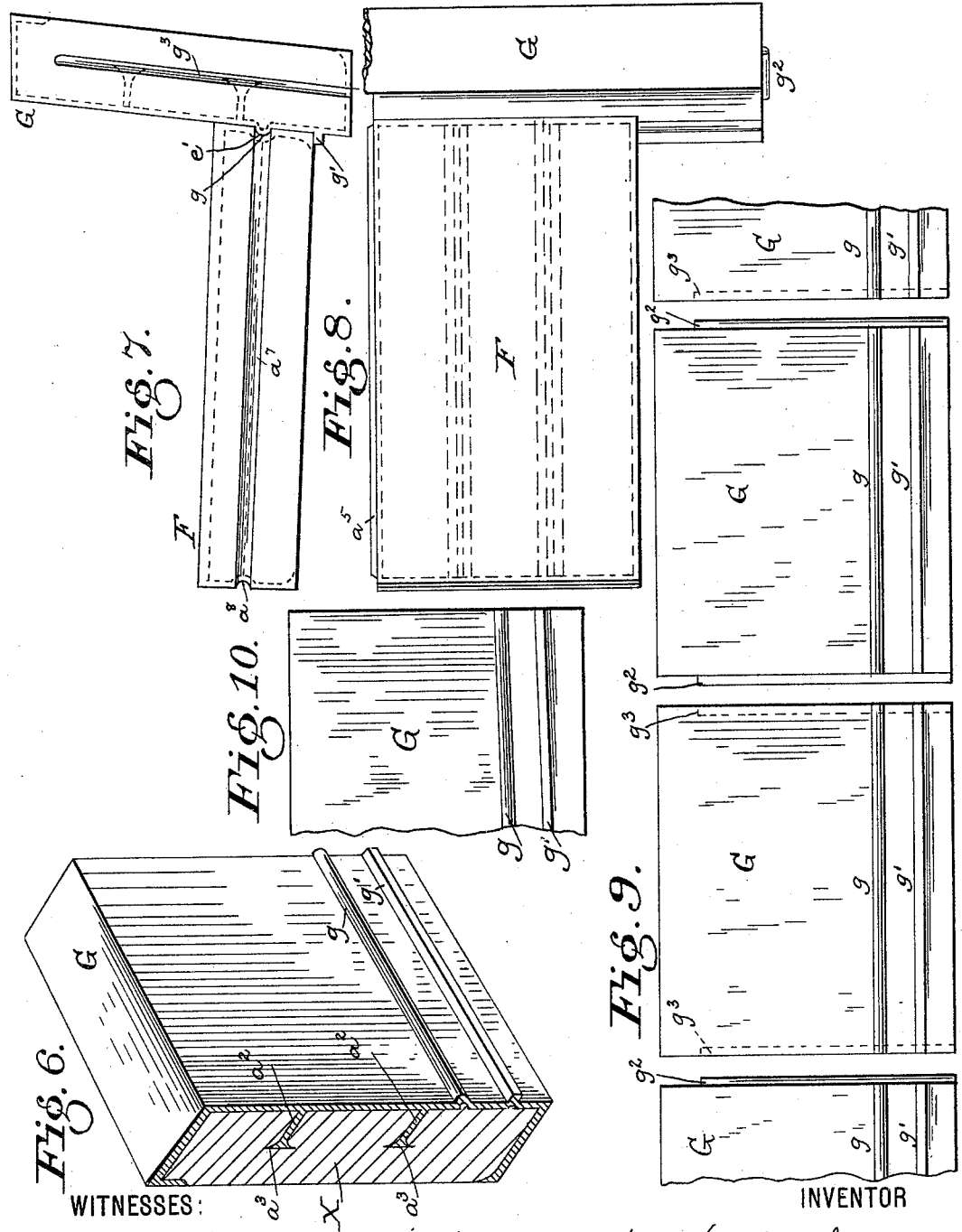

(No Model.) 5 Sheets—Sheet 3.
W. H. NORTHCUTT.
COMBINATION PAVING BLOCK AND SYSTEM OF PAVING.
No. 584,269. Patented June 8, 1897.
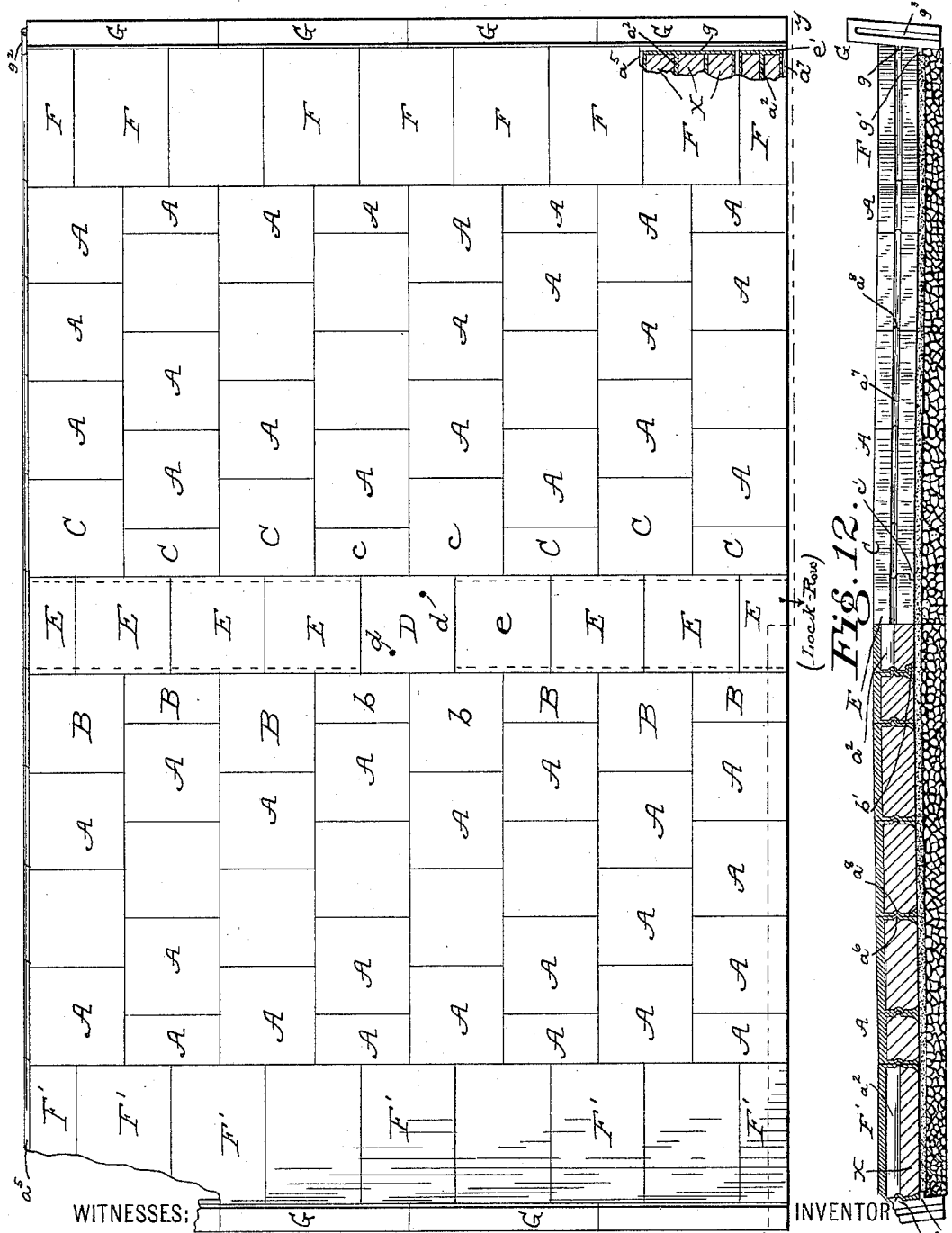
WITNESSES:
Z. Frank Martin
Wm H Gilbert
INVENTOR
Wm. H. Northcutt,
BY Frank M. Burnham.
his ATTORNEY.

(No Model.) 5 Sheets—Sheet 4.
W. H. NORTHCUTT.
COMBINATION PAVING BLOCK AND SYSTEM OF PAVING.
No. 584,269. Patented June 8, 1897.
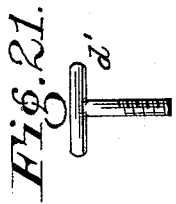
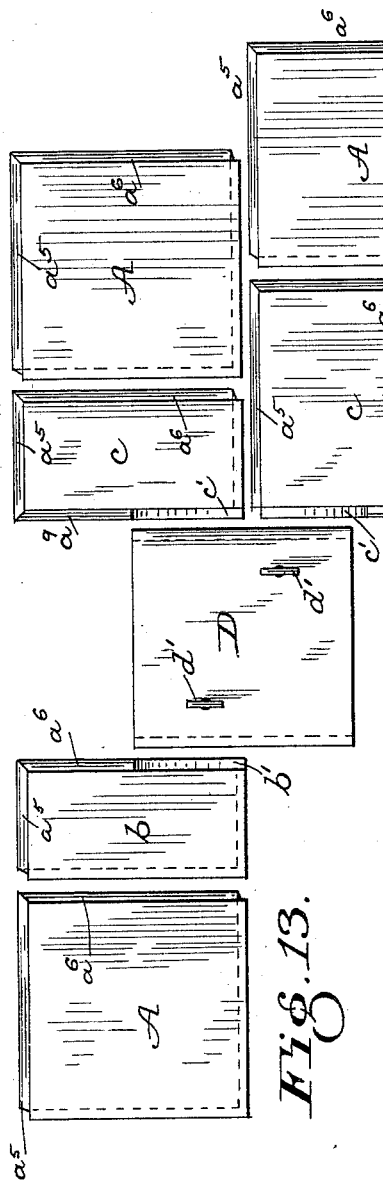
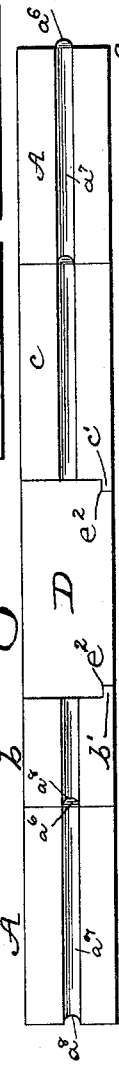
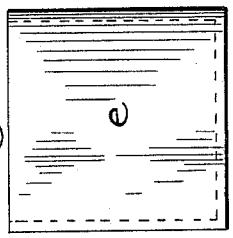
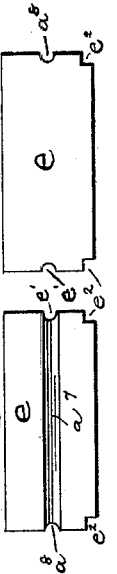
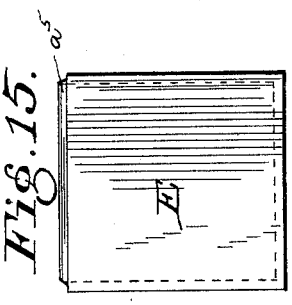
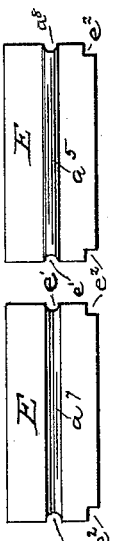
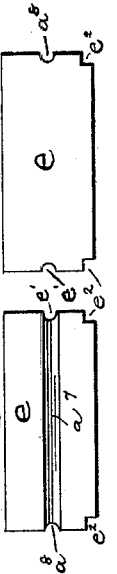
WITNESSES: Z. Frank Martin
Wm H Gilbert
INVENTOR
Wm H Northcutt
BY Frank M Burnham
his ATTORNEY.

(No Model.)  5 Sheets—Sheet 5.

W. H. NORTHCUTT.
COMBINATION PAVING BLOCK AND SYSTEM OF PAVING.

No. 584,269.  Patented June 8, 1897.

WITNESSES:
Z. Frank Martin
Wm H Gilbert

INVENTOR
Wm H Northcutt
BY
Frank M. Burnham.
his ATTORNEY.

UNITED STATES PATENT OFFICE.

WILLIAM HANCE NORTHCUTT, OF TROY, OHIO.

COMBINATION PAVING-BLOCK AND SYSTEM OF PAVING.

SPECIFICATION forming part of Letters Patent No. 584,269, dated June 8, 1897.

Application filed August 11, 1896. Serial No. 602,438. (No model.)

*To all whom it may concern:*

Be it known that I, WILLIAM HANCE NORTHCUTT, a citizen of the United States, residing at Troy, in the county of Miami and State of Ohio, have invented certain new and useful Improvements in Combination Paving-Blocks and System of Paving; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to a combination paving-block for gutters, curbs, &c., and system of paving to be employed in the construction of roadways and walks of streets, alleys, public or private thoroughfares, or when formed of curved shape in arching tunnels, large sewers, &c.; and it consists in their peculiar construction and novel form and system of laying same, as will be hereinafter fully described, and pointed out in the claims.

The objects of my invention, and which furnish it with special advantages over all similar inventions of like class, consist in its durability, strength, simplicity in system of laying and repairing, (it being impossible to get out of order like most pavements,) also in leaving no debris or rubbish to handle and remove, the blocks being manufactured at one point and shipped and hauled to the street to be paved or arch or sewer to be built, and forming an even surface or roadway over which the lightest or heaviest loads alike can pass without the least jarring or jolting.

Figure 22:
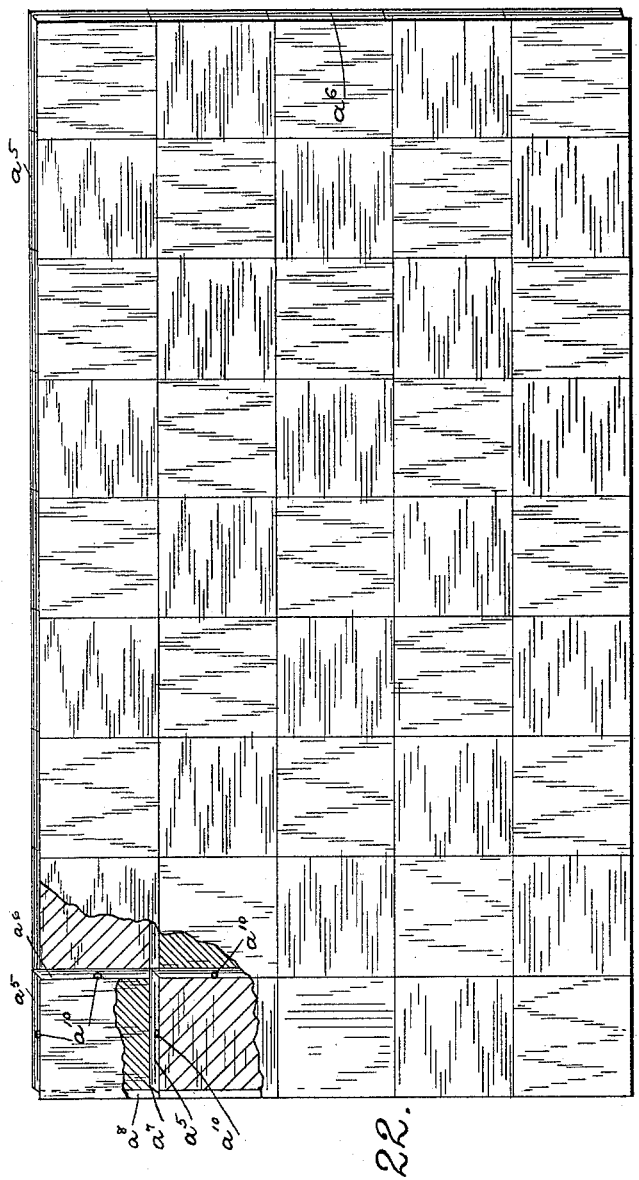

Referring to the accompanying drawings, illustrating my invention and in which similar letters of reference indicate like parts in the several views, Figure 1 is a perspective view of my improved paving-block, partly in section. Fig. 2 is a side elevation of said block. Fig. 3 is a front end elevation of said block. Fig. 4 is a plan view of top of said block. Fig. 5 is a plan view of bottom of metallic shell of a paving-block previous to being filled. Fig. 6 is a perspective view, partly in section, of curb-block embodying the features of my invention. Fig. 7 is a side or edge view of curb and gutter block properly adjusted together, and Fig. 8 is plan view of same. Fig. 9 is a front view of section of curb-blocks ready to be fitted together. Fig. 10 is front view of curb-blocks, showing tongue and ledge slightly inclined where it is necessary to lay street with summit for drainage. Fig. 11 is a view of section or roadway of street from curb to curb laid with my improved paving-blocks, showing manner of breaking joints. Fig. 12 is end view, partly in section, taken on line $y\,y$ of Fig. 11. Fig. 13 is a plan view of key-block and adjacent blocks of other rows slightly apart to show tongues and half-tongues, with ledge beneath for reception of key-block. Fig. 14 is edge view of blocks shown in Fig. 13 when pushed together. Fig. 15 is plan view of an ordinary lock-block. Figs. 16 and 17 are views of rear and forward ends, respectively, of block shown in Fig. 15. Fig. 18 is plan view of lock-block in rear of key-block, having its forward end smooth. Figs. 19 and 20 are views of rear and forward ends, respectively, of block shown in Fig. 18. Fig. 21 is view of one of the key-block lifters. Fig. 22 is a plan, and Figs. 23, 24, 25, and 26 are views, of two different styles of modification of my form of construction as applied to wooden blocks for ornamental inlaid work.

A are whole and half paving-blocks cast of or pressed from metal of suitable thickness, their top portions $a$ formed with raised portions $a'$ of squares or any suitable design and far enough apart to prevent of slipping or sliding of horses, vehicles, or persons, and being somewhat thicker than its side and end walls, so as to more readily, in connection with its inside flanged locks $a^2$, support the weight of any vehicle, no matter how heavily loaded, that may pass over it. Said flanged locks $a^2$ extend across the width of each block, and thus traversing width of street, so that wagons or other vehicles will have to pass over and across them, and are located inside of the shell and are a part of and formed integral with top $a$, from which they depend downwardly about half the depth of block, being so formed at their depending ends $a^3$ as to firmly hold or lock in the shell the filling X as it sets or hardens. Said filling X can be of any composition of cement mortar or suitable plastic substance, so that when firmly pressed or tamped into the metallic shell of block as it becomes seasoned will set, becoming as hard and heavy as stone.

$a^4$ is lower or bottom flange extending inwardly and continuously around the four walls of the shell, to assist in locking and keeping filling X in place after it hardens.

The forward or front end wall and right-side wall of metallic shell of each and every one of my ordinary paving-blocks (excepting key-blocks, lock-blocks, comprising the lock-row, and the blocks adjacent to on right and left hand sides thereof of said lock-row) are cast or pressed with a continuous tongue as to two sides of the blocks or what may be termed a "front-end" tongue $a^5$ and "right-hand" tongue $a^6$, according to their respective locations, and are situated exactly at or about midway of the depth of said block, the inside face of said tongues being necessarily concaved, so that the plastic filling after it sets and hardens is not alone thereby locked in the shell, but said filling helps to retain the outside convexed contour of said tongues $a^5$ and $a^6$.

Rear-end grooves $a^7$ and left-hand grooves $a^8$ are situated about midway the depth of the block, formed integral and continuous with rear-end and left-side walls of metallic shell, being exactly similar to, as above described, tongues $a^5$ and $a^6$, excepting their convexed and concaved faces being reversed, so that the convexed face of said grooves $a^7$ and $a^8$ will now come on inside of shell, thus assisting, with other locking parts above referred to, in holding or keeping said plastic filling X, when it sets or hardens, in its proper position in the shell, while their outside or concaved faces form the rear-end groove $a^7$ and left-hand groove $a^8$, said rear groove $a^7$ fitting tightly against and around front-end tongues $a^5$ $a^5$ of two blocks directly in rear and left-hand groove $a^8$ fitting tightly against and around right-hand tongue $a^6$ of the block directly to the left.

Some of these ordinary paving-blocks A, as well as every alternating block in the rows on left and right side of lock-row and two of the lock-row blocks, for the purpose of breaking joints and thus forming a stronger, durable, and more complete and simple system of paving, are laid in half-blocks, as shown in Fig. 11, and can, when there is a street with exceptional wide roadway having an exceptional amount of heavy travel and traffic, if preferred, have more than one tongue $a^5$ and $a^6$ and more than one groove $a^7$ and $a^8$, although I do not think it will be necessary to construct my paving-blocks with but one tongue $a^5$ on front end and one tongue $a^6$ on right-hand side, one groove $a^7$ on rear end, and one groove $a^8$ on left-hand side of the whole and half blocks A, B, and $b$, as I have shown.

B and $b$ are whole and half blocks and are laid directly adjacent to and on the left-hand side of the lock-row, and are constructed identically the same as whole and half block A—with front-end tongues and right tongues and rear and left grooves—with the addition of a right-angle ledge or extension $b$ (see dotted lines, Fig. 11, and Figs. 13 and 14) from their bottom or base the entire length of their right-hand sides, just below their right-hand tongues $a^6$, upon which rest and slide the lock-row blocks E up to the opening left by taking out the key-block D when it is necessary to move the blocks for repairing, as will be more fully described hereinafter. The two blocks $b$ $b$ in this row on left-hand side of lock-row are constructed with tongues $a^5$ $a^6$ and grooves $a^7$ $a^8$, same as blocks A and other blocks B in this row, excepting from the center of rear block $b$ up and along to its front end one-half of tongue $a^6$ is omitted, thus presenting a smooth face, and from center of upper or forward block $b$ down to its rear end one-half of its tongue $a^6$ is in like manner omitted, thus presenting a smooth face, which, together with smooth face of its twin block just above it, as described, and in connection with the two blocks $c$ $c$ directly opposite on right-hand side of lock-row, allows of key-block D being inserted when laying the pavement or by being lifted out when necessary to repair any portion thereof by its two lifters or handles $d'$ $d'$, (see Figs. 13 and 21,) said handles or lifters $d'$ $d'$ being of any suitable form of construction so long as provided with screw-threaded shanks to fit corresponding screw-threaded openings or holes $d$ $d$ in said key-block D, said key-block being constructed with the angular grooves $e^2$ $e^2$ on edge of right and left bottom sides to fit over ledges or extensions $b'$ and $c'$, respectively, while its forward or front and rear end walls or sides are perfectly smooth.

C and $c$ are whole and half blocks laid directly adjacent to and on the right-hand side of lock-row, and are constructed the same as whole and half blocks B and $b$, being similarly provided with right-angle ledges or extensions $c'$ (see dotted lines, Fig. 11, and Figs. 13 and 14) from their bottoms or base the entire length of their left-hand sides, (just reverse side of blocks B and $b$.) Said ledges or extensions $c'$, in connection with ledges or extensions $b'$ on blocks B and $b$ on left of lock-row, answer the purpose, viz., of allowing lock-blocks E and lock-block $e$ to slide to or from opening of key-block D when laying and repairing, as hereinbefore described. Said ledges or extensions $c'$ on blocks C and $c$, as above described, are below a left-hand tongue $a^9$, which takes the same position as tongue $a^8$ on blocks A and B and are the only blocks in my whole system of paving having tongues on three sides—viz., front tongue $a^5$, right-hand tongue $a^6$, and left-hand tongue $a^9$.

The two blocks $c$ $c$ in right-hand row are formed the same as other blocks C in this row, being provided with bottom ledges or extensions $c'$, forward tongues $a^5$, right-hand tongues $a^6$, and left-hand tongues $a^9$, excepting that the upper and lower halves, extending from their centers out along their left-hand sides—instead of right-hand side, same as the two blocks $b$ $b$ on opposite side of key-block D and which they act in connection with—have half of their left-hand tongues $a^9$ omitted, thus presenting a perfectly smooth side, so that key-block D by having its two handles or lifters $d'$ $d'$ screwed into the openings $d$ $d$ can be lifted out at will and the blocks shifted or worked to the opening thus left by key-block D and taken entirely out for the purpose of relaying one or more blocks should it be necessary to do any repairing, as hereinbefore referred to, although it will seldom be necessary so to do, as my paving-blocks will last indefinitely.

The lock-row is laid in center of street, except when there may be a street-car or railroad track to interfere, and in this case I prefer to lay two lock-rows, each row being in center of driveway left on each side by rails of track, and is composed of whole and half blocks E, key-block D, (which are laid anywhere from every fifteen to twenty blocks,) and block $e$. (See Fig. 11.)

Blocks E and block $e$ differ from all other blocks, (excepting gutter-blocks F on right-hand side,) which are similar in having a right-hand groove $e'$ on their right side which fits tightly against and around left-hand tongues and half-tongues $a^9$, and being further provided with a left-hand groove $a^8$, which fits tightly against and around right-hand tongues and half-tongue $a^6$, thus permitting them to be slid or moved to opening left by key-block D, as already fully described; but lock-block $e$ differs in one particular from all other blocks and the rest of blocks in lock-row in having front-end tongue $a^5$ omitted, so as to present a perfectly smooth and free front end or side to allow of reception or removal of key-block. Lock-blocks E and lock-block $e$ are further provided with right and left angular grooves $e^2$ $e^2$, which fit tightly around and against bottom ledges $c'$ on right-hand row of blocks C and $c$ and ledges or bottom extensions $b'$ on blocks B and $b$ in row on left of lock-row, for the purpose, as heretofore described, of assisting in being moved or slid to and removed from opening left in lock-row when lock-block D is removed.

Gutter-blocks F are made in whole and half blocks (for purpose of breaking joints) and are located on right side of pavement of roadway, and are formed with grooves $a^8$ on left-hand side to fit tightly against and around right-hand tongues $a^6$ on right-hand side of adjacent block A on left of said gutter-blocks F, and $e'$ are grooves formed on right side of gutter-blocks F to fit tightly against and around tongue $g$ on curb-blocks G. Said gutter-blocks F are also provided with front or forward end tongues $a^5$ and rear-end grooves $a^7$, said grooves $a^7$ fitting against and around the tongue $a^5$ of its rear mate gutter-block F.

Gutter-blocks F' are made in whole and half blocks (for purpose of breaking joints) and are located on left-hand side of pavement of roadway and are formed with tongues $a^5$ on front or forward end and grooves $a^7$ on end exactly similar to and for like purposes, as already described; right-hand tongue $a^6$ to fit in grooves $a^8$ in blocks A, directly on its right; left-hand grooves $a^8$ on its left side to fit around and against tongue $g$ on curb-blocks G.

Curb-blocks G are made exactly similar on each side, being provided with tongues $g$ to fit in the grooves $e'$ and grooves $a^8$ on right and left hand sides of right and left gutter-blocks, respectively, and a bottom ledge $g'$, which comes directly under the outside edge of each row of gutter-blocks and acts as a support for same. Said tongues $g$ and ledges $g'$ are placed straight across the face of curb-blocks (see Figs. 6 and 9) except when it is necessary to incline the pavement for a summit for drainage, and in this case said tongues $g$ and ledges $g'$ are inclined, as shown in Fig. 10.

Curb-blocks G and every block in any portion of my system of paving are constructed with the plastic filling X, which, as it hardens and sets in the metallic shell, is held in position by locking-flanges $a^2$, having ends $a^3$ in connection with other locking devices already fully described and as I have clearly shown in Fig. 1.

Every other curb-block G is provided at each of its two ends with either tongues $g^2$ $g^2$ or grooves $g^3$ $g^3$, the two grooves $g^3$ $g^3$ extending from its lowest point, no matter how far it may be embedded in the earth, to within a short distance of its top, so as to receive the tongues $g^2$ $g^2$ (see Figs. 7 and 11) on other curb-block G, placed on side, and thus be firmly held in position and yet readily displaced by any curb-block G in row and along edge of sidewalk, being pulled up and out when necessary to repair curb and place new blocks.

The whole pavement from curb to curb and all walks are laid on not less than one inch of good sand, which is placed upon a prepared foundation, first leveled, thus forming an elastic cushion, which also allows of and adjusts itself to any action of contraction and expansion, as the blocks at their top are somewhat loose and not very tight together. These blocks, if so desired, may be laid with a narrow strip of tarred paper at their bottoms between each one, thus further assisting to overcome the action of contraction and expansion and also prevent the blocks from corroding together. On sidewalks and very narrow driveways the lock-row may be omitted and only my ordinary blocks used.

It will be seen that my peculiarly-formed paving-blocks laid as described will form a complete system of interlocking pavement, of which it will be practically impossible to displace or remove any block or blocks up or down or sidewise without first lifting the key-block out of its place and moving lock-row blocks to key-opening, as described.

To reach any desired point in the work after the lock-rows have been opened as described, the blocks can be moved at right angles in either direction, across or parallel with the street. I am well aware of metallic blocks for street purposes with various fillings, such as sand and other material, but am not aware of a single claim on a block having a filling to be as hard as stone and so heavy that its weight will help to retain it in position, or am I aware of any blocks for street purposes having my exact form of construction of metallic grooves, tongues, and other features.

Figure 24:
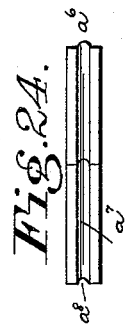
Figure 23:
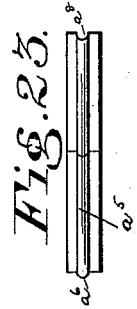

In Figs. 22, 23, and 24 I have shown a modified form of my system of tonguing and grooving as applied to solid wooden blocks (not having any filling or locking devices) to be used in laying ornamental or inlaid floors, tops of counters, &c., having front or forward end tongues $a^5$, right-hand tongues $a^6$, rear grooves $a^7$, and left-side grooves $a^8$. Each of these wooden blocks as it is laid is secretly nailed or screwed to the floor, as shown at $a^{10}$, Fig. 22, (instead of old style of nailing through top of block and thus marring its ornamental effect,) and as the next block is laid, if directly in front, its rear groove $a^7$ will fit around front or forward tongue $a^5$ of block just previously laid, or if laid to right of first block its left-hand groove $a^8$ will fit around right-hand tongue $a^6$ of first-laid block. It will be, of course, understood that the nails are driven at an incline, so as not to interfere with joining the blocks as laid. It will also be observed that I do not break joints, as when applied to my paving-blocks, and that the grain of the wood of one block will come exactly across the grain of the other block throughout the entire floor to be laid or counter to be covered or inlaid, (see Fig. 22,) and the grain of each block thus impinging crosswise against the grain of the other will prevent cupping, troughing, or warping up, so often seen in ordinary floors, and producing a very ornamental and artistic effect even when laid with one kind of wood throughout; but to further increase this artistic effect alternating rows of various kinds of wood (plain or quartered) may be used so long as the system of crossing grains is adhered to.

Figure 26:
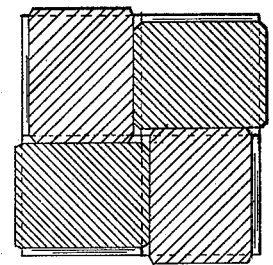
Figure 25:
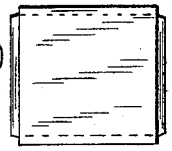

In Figs. 25 and 26 I have shown yet another form of my modification as applied to ornamental inlaid wooden blocks, in which the tongues and grooves are not continuous on two sides, being constructed with two tongues and two grooves alternating around the four sides.

What I claim as my invention, and desire to secure by Letters Patent, is—

1. A paving-block having a metallic shell, comprising a top of raised or roughened design, formed with internal depending locking-flanges; four sides or walls provided on the inside with continuous tongues on two sides and continuous grooves on two sides or walls; open bottom with continuous inwardly-projecting flange around its four walls, all formed integral, and a hard, heavy interior filling, substantially as set forth and described.

2. A paving-block having a metallic shell, comprising a top of raised or roughened design, formed with internal locking-flanges depending from the top; four sides or walls provided with continuous tongues on two sides and continuous grooves on the remaining two sides or walls; angular ledge or extension extending outwardly along one side near the bottom; open bottom with continuous flange at the bottom projecting inwardly around its four walls, all formed integral, and a hard heavy interior filling, substantially as set forth and described.

3. An improved paving-block consisting of a metallic shell; having a top of raised or roughened design formed with internal depending locking-flanges; four sides or walls provided with a tongue on one side, a half-tongue on one side, two continuous grooves on two sides; bottom angular ledge or extension along one side; open bottom with continuous flange around its four walls all formed integral; a hard heavy interior filling; substantially as and for the purposes specified.

4. An improved paving-block for lock-rows of pavements, consisting of a metallic shell, having a top of raised or roughened design, formed with internal depending locking-flanges; four sides or walls provided with tongue on one side, a continuous groove as to three sides; an angular groove on bottom of two sides; open bottom with continuous flange around its four walls all formed integral; a hard heavy interior filling, substantially as described.

5. An improved paving-block for lock-rows of pavements, consisting of a metallic shell, having a top of raised or roughened design, formed with internal depending locking-flanges; four sides or walls provided with continuous grooves as to three sides; angular grooves on bottom of two sides; one side or end perfectly smooth; open bottom with continuous flange around its four walls all formed integral; a hard heavy interior filling, substantially as and for the purposes specified.

6. In a key-block for pavements consisting of a metallic shell, having a top of raised or roughened design, having screw-thread holes to receive screw-thread shanks of lifters; and formed with internal depending locking-flanges; four sides or walls, two opposite ones of which are smooth, in the bottom of other two along their entire length an angular groove; open bottom with continuous flange around its four walls all formed integral; a hard heavy interior filling; substantially as and for the purposes specified.

7. An improved paving-block consisting of a metallic shell, having a top of raised or roughened design, formed with internal depending locking-flanges; four sides or walls provided with tongues continuous on three sides, groove on one side, angular ledge or extension along bottom of one side; open bottom with continuous flange around its four walls all formed integral; a hard heavy interior filling, substantially as and for the purposes indicated and described.

8. An improved paving-block consisting of a metallic shell, having a top of raised or roughened design, formed with internal depending locking-flanges; four sides or walls provided with tongues continuous on two sides, a tongue along half of one side, groove on one side; angular ledge or extension along bottom of one side; open bottom with continuous flange around its four walls all formed integral; a hard heavy interior filling, substantially as and for the purposes indicated and described.

9. A paving-block having a metallic shell; comprising a smooth top, formed with internal depending locking-flanges; four sides or walls, provided with a tongue on one side and grooves continuous on three sides; open bottom with continuous flange around its four walls, all formed integral; a hard heavy interior filling; substantially as shown and described.

10. An improved paving-block for gutters, consisting of a metallic shell, having a smooth top or surface, formed with internal depending locking-flanges; four sides or walls provided with continuous tongue as to two sides, continuous groove as to two sides, open bottom with continuous flange around its four walls all formed integral; a hard heavy interior filling; substantially as and for the purposes set forth and described.

11. An improved paving-block for curbs, consisting of a metallic shell, having internal locking-flanges, a tongue and ledge in a straight line across its face, a groove on its two opposite edges, open back with continuous flange around the four walls or edges, all formed integral; a hard heavy interior filling; substantially as and for the purposes set forth and described.

12. An improved paving-block for curbs, consisting of a metallic shell, having internal locking-flanges, a tongue and ledge at an incline or slant across its face when a summit is needed; a groove or tongue on its two opposite edges, open back with continuous flange around the four walls or edges, all formed integral; a hard heavy interior filling; substantially as and for the purposes set forth and described.

13. An improved paving-block for curbs, consisting of a metallic shell, having internal locking-flanges, a tongue and ledge on its face, a tongue on its two opposite edges, open back with continuous flange around its four walls or edges all formed integral; a hard heavy interior filling; substantially as and for the purposes indicated and described.

14. In a pavement, the combination of a row of paving lock-blocks, rows of interlocking blocks on each side of the lock-blocks, a row of gutter-blocks and curb-blocks on the outside of the interlocking blocks, a key-block D, in the middle of the row of lock-blocks for holding all the blocks intact, substantially as set forth.

15. A solid wooden block for ornamental or inlaid work, comprising a continuous tongue on two sides or ledges, a groove on two opposite sides or ledges, each block so formed that when laid, the grain of one block will impinge against and crosswise the grain of alternating or abutting blocks, thus preventing warping, substantially as specified.

In testimony whereof I affix my signature in presence of two witnesses.

WILLIAM HANCE NORTHCUTT.

Witnesses:
  JOHN B. FOGLE,
  JOHN A. MCCURDY.